G. K. McEWEN.
NUTCRACKER.
APPLICATION FILED MAY 21, 1914.
1,129,213. Patented Feb. 23, 1915.
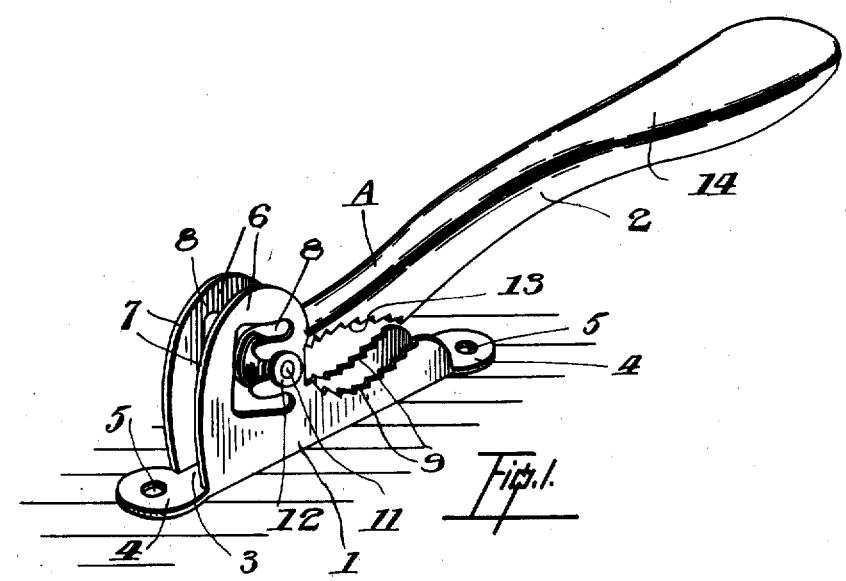
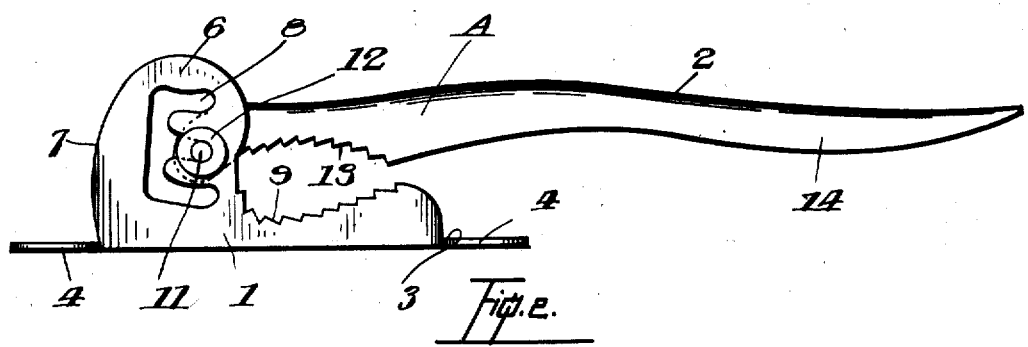
WITNESSES
INVENTOR
G. K. McEWEN.
BY Fetherstonhaugh & Smart
ATT'YS.

UNITED STATES PATENT OFFICE.

GEORGE KILPATRICK McEWEN, OF SWIFT CURRENT, SASKATCHEWAN, CANADA.

NUTCRACKER.

1,129,213.  Specification of Letters Patent.  Patented Feb. 23, 1915.

Application filed May 21, 1914. Serial No. 840,033.

*To all whom it may concern:*

Be it known that I, GEORGE KILPATRICK MCEWEN, a subject of the King of Great Britain, and resident of Swift Current, Province of Saskatchewan, Dominion of Canada, have invented certain new and useful Improvements in Nutcrackers, of which the following is the specification.

This invention relates to nut crackers and the objects of the invention are to render the cracker capable of being adjusted to suit any size of nut, to more easily and uniformly crack the nut so that the kernel will not be unduly crushed in the operation, to render the several parts better adapted to perform the functions required of them and other objects which will be shown hereafter, and it consists essentially of the improved nut cracker particularly described in the following specification and accompanying drawings forming part of the same.

In the drawings, Figure 1 is a perspective view of the improved nut cracker. Fig. 2 is a side elevation of the same.

Like characters of reference refer to like parts in the several drawings.

Referring to the drawings, A represents the improved nut cracker comprising the lower part 1 and the lever 2. This lower part consists of the plate 3 which terminates in suitably rounded ends 4 having orifices 5 therethrough, such plate being provided on its lateral sides intermediate of its ends with upwardly extending parallel arms 6 which are at substantially right angles to the said plate and preferably formed integral therewith, such plate being adapted to be secured to any suitable base by means of screws or the like.

In the embodiment illustrated, the back part 7 of the said arms is made suitably curved and is about three times higher than the front part thereof, such back part being provided with substantially E-shaped orifices 8 extending transversely therethrough, the front part of the arms 6 being provided on their upper edge with a concave curve provided with transversely extending serrations or teeth 9, such serrated curved edges being designed to form the lower jaw of the cracker, in which jaw the nuts to be cracked are placed.

The inner end of the lever 2 is designed to be located between the arms 6 and is provided with a transversely extending orifice therethrough with which the pin 11 is designed to engage, such pin being adapted to slidably engage with the E-shaped orifice 8 in the said arms and be secured therein by means of the collars 12 which are adapted to be fixed to the outer end of the said pin. The lower edges of the lever 2 adjacent to the arms 6 are formed with a concave curve having transversely extending serrations 13 therein, such serrated curves forming the upper jaw and being located directly above the lower jaw of the cracker. That end of the lever remote from the jaws terminates in a suitable handle 14.

In the operation of the cracker, the lever 2 is rotated upwardly in a vertical plane and a nut placed in the lower jaw, the lever 2 being now lowered until the upper jaw engages with the said nut when the necessary pressure on the handle 14 of the lever will crack the shell of the nut. It will be seen that since the jaws are serrated in this manner and the arms forming the jaws are spaced apart that it is quite impossible for the nut to slip out of the lateral side of the said jaws, while the concave form of the said jaws permits of an evenly and uniformly distributed pressure being put in the shell of the nut so that the said shell breaks without the liability of the kernel of the nut being crushed as is so often found in ordinary nut crackers.

It is quite clear that to adjust the jaws of the nut cracker the pin 11 carried by the end of the lever 2 is made to engage with the different parallel arms of the said E-shaped orifice, thereby spacing the jaws to the desired distance apart.

As many changes could be made in the above construction and many apparently widely different embodiments of my invention, within the scope of the claim, constructed without departing from the spirit or scope thereof, it is intended that all matter contained in the accompanying specification and drawings shall be interpreted as illustrative and not in a limiting sense.

What I claim as my invention is:

A nut cracker comprising a lower part or base plate, upwardly projecting sides integral therewith, a lower jaw formed by said sides at one end of said plate and at the other end of said plate said sides projecting higher than at the jaw end, and a handle member having an upper jaw formed thereon pivoted in said higher projections above the highest point of the lower jaw.

In witness whereof I have hereunto set my hand in the presence of two witnesses.

GEORGE KILPATRICK McEWEN.

Witnesses:
JAMES O. BEGG,
BESSIE E. MAHONEY.

Correction in Letters Patent No. 1,129,213.

It is hereby certified that the name of the patentee in Letters Patent No. 1,129,213, granted February 23, 1915, for an improvement in "Nutcrackers," was erroneously written and printed "George Kilpatrick McEwen," whereas said name should have been written and printed *George Kilpatrick McEwan;* and that the said Letters Patent should be read with this correction therein that the same may conform to the record of the case in the Patent Office.

Signed and sealed this 30th day of March, A. D., 1915.

[SEAL.]                                                    J. T. NEWTON,

*Acting Commissioner of Patents.*